United States Patent
Liegeois et al.

(10) Patent No.: US 9,802,697 B2
(45) Date of Patent: Oct. 31, 2017

(54) AIRCRAFT LANDING GEAR

(71) Applicant: MESSIER-BUGATTI-DOWTY, Velizy Villacoublay (FR)

(72) Inventors: Pierre-Yves Liegeois, Velizy-Villacoublay (FR); Thierry Blanpain, Velizy-Villacoublay (FR); Edouard Campbell, Velizy-Villacoublay (FR)

(73) Assignee: MESSIER-BUGATTI-DOWTY, Velizy Villacoublay (FR)

( * ) Notice: Subject to any disclaimer, the term of this patent is extended or adjusted under 35 U.S.C. 154(b) by 230 days.

(21) Appl. No.: 14/877,253

(22) Filed: Oct. 7, 2015

(65) Prior Publication Data

US 2016/0101849 A1    Apr. 14, 2016

(30) Foreign Application Priority Data

Oct. 10, 2014  (FR) ...................... 14 59729

(51) Int. Cl.
*B64C 25/34* (2006.01)
*B64C 25/50* (2006.01)

(52) U.S. Cl.
CPC ............ *B64C 25/505* (2013.01); *B64C 25/34* (2013.01); *Y02T 50/54* (2013.01)

(58) Field of Classification Search
CPC .............................. B64C 25/505; B64C 25/34
See application file for complete search history.

(56) References Cited

U.S. PATENT DOCUMENTS

| | | | | |
|---|---|---|---|---|
| 2,372,710 A | * | 4/1945 | Chisholm, Jr. | ....... B64C 25/505 180/429 |
| 2,383,773 A | * | 8/1945 | Chisholm, Jr. | ....... B64C 25/505 244/100 R |
| 2,589,341 A | * | 3/1952 | Chisholm, Jr. | ....... B64C 25/505 180/429 |

(Continued)

FOREIGN PATENT DOCUMENTS

| | | |
|---|---|---|
| EP | 2 107 004 A2 | 10/2009 |
| GB | 2 459 714 A | 11/2009 |
| GB | 2 482 154 A | 1/2012 |

OTHER PUBLICATIONS

French Preliminary Search Report for FR 14 59729 dated May 27, 2015.
French Written Opinion for FR 14 59729 dated May 27, 2015.

*Primary Examiner* — Philip J Bonzell
*Assistant Examiner* — Michael Kreiner
(74) *Attorney, Agent, or Firm* — Sughrue Mion, PLLC

(57) ABSTRACT

The invention relates to an aircraft landing gear equipped with a steering device (7) for orienting the wheels (5), the steering device (7) comprising a body (8) in which is incorporated an electromechanical actuator (41) equipped with an electric motor (42). The landing gear is further equipped with damping means intended to limit the transmission of vibration from the wheel (5) to the rest of the landing gear (1) when the aircraft is on the ground. The body (8) of the steering device (7) is mounted with the ability to rotate with a limited amplitude of rotation. The damping means are mounted between the body (8) of the steering device (7) and the strut assembly (2) of the landing gear to damp the vibration between the body (8) of the steering device (7) and the strut assembly (2).

12 Claims, 2 Drawing Sheets

(56) References Cited

U.S. PATENT DOCUMENTS

| | | | | |
|---|---|---|---|---|
| 2,613,649 | A * | 10/1952 | Diebel | B64C 25/505 |
| | | | | 180/431 |
| 2,830,562 | A * | 4/1958 | Hogan | B64C 25/505 |
| | | | | 137/636.1 |
| 2,943,817 | A * | 7/1960 | Hogan | B64C 25/505 |
| | | | | 244/50 |
| 3,151,533 | A * | 10/1964 | Hartel | B64C 25/505 |
| | | | | 180/428 |
| 3,391,580 | A * | 7/1968 | Stadler | B64C 25/505 |
| | | | | 244/50 |
| 5,002,143 | A * | 3/1991 | Bernard | F15B 15/06 |
| | | | | 180/432 |
| 8,480,026 | B2 * | 7/2013 | Luce | B64C 25/505 |
| | | | | 244/104 R |
| 8,752,790 | B2 * | 6/2014 | Humphrey | B64C 25/505 |
| | | | | 244/102 A |
| 9,056,672 | B2 * | 6/2015 | Keller | B64C 25/24 |
| 2005/0200328 | A1 | 9/2005 | Edson et al. | |
| 2012/0305702 | A1 * | 12/2012 | Bucheton | F16D 3/62 |
| | | | | 244/101 |

\* cited by examiner

AIRCRAFT LANDING GEAR

This application claims priority from French Patent Application No. 14 59729 filed Oct. 10, 2014, the contents of all of which are incorporated herein by reference in their entirety.

The invention relates to the field of steered aircraft landing gears equipped with <<anti-shimmy>> systems.

BACKGROUND OF THE INVENTION

Aircraft landing gears comprising a steered lower part and a steering device designed to turn the steered lower part in response to a steering command are known. Conventionally, such a landing gear comprises a strut assembly, an orientable strut sliding in the strut assembly and bearing the wheels, a steering tube mounted with the ability to rotate and a torque link connecting the steering tube and the orientable strut in terms of rotation. The steering device acts on the steering tube to make the orientable strut turn and therefore also the wheels via the torque link.

There are numerous types of steering device: some comprise one or two hydraulic jacks, others a rack-type actuator, others still, an electromechanical actuator, etc.

Thus, in the field of naval aircraft carried on carriers, it is known practice to use a steering device comprising an actuator with a hydraulic motor collaborating with a toothed wheel secured to the steered lower part of the landing gear.

In the field of light aircraft, it is known practice to use a steering device comprising an actuator with an electric motor collaborating with a toothed wheel secured to the steering lower part of the landing gear.

Within the context of the development of a more electric aircraft, numerous studies are looking to improve the existing steering devices equipped with an electromechanical actuator.

Such a steering device is equipped with damping means intended to limit the transmission of vibration from the wheel to the rest of the landing gear when the aircraft is on the ground. This vibration is caused notably by the "shimmy" which in general refers to a phenomenon of torsional oscillation of vertical axis likely to arise on a landing gear when the aircraft is running along the ground at a sufficiently high speed. This vibration is also the result of the release of energy at the moment of a blow-out of a tyre of a wheel of the landing gear on landing.

In order to limit the load supplied to the actuator and the landing gear, it has been envisioned for a torque limiter to be introduced into the electromechanical actuator drive train, the role of this torque limiter being to protect the electromechanical actuator and the structural components of the landing gear and to absorb and dissipate the energy released in a tyre blow-out.

Because the torque limiter is incorporated directly into the drive train, its use makes it impossible to disconnect the output shaft of the motor from the steering tube, because such disengagement would lead to deactivation of the damping means. Thus, in order to tow the aircraft around on the runway, use is made of the reversibility of the drivetrain of the electromechanical actuator, and this imposes great constraints on the design thereof. This solution has no means of damping the oscillations caused by the shimmy and generating loads below the torque limiter actuation threshold.

OBJECT OF THE INVENTION

The object of the invention is an aircraft landing gear that does not have the aforementioned disadvantage.

SUMMARY OF THE INVENTION

In order to achieve this objective, there is proposed an aircraft landing gear comprising a strut assembly articulated to the structure of the aircraft, a strut sliding along an axis of sliding X in the strut assembly and a free end of which carries at least one wheel, a steering tube mounted with the ability to rotate about the axis X, and a torque link connecting the steering tube and the strut in terms of rotation, the landing gear additionally being equipped with a steering device for orienting the wheel about the axis X, the steering device comprising a body in which is incorporated an electromechanical actuator equipped with an electric motor intended to drive the rotation of the steering tube and therefore of the strut in order to steer the wheel, the landing gear being further equipped with damping means intended to limit the transmission of vibration from the wheel to the rest of the landing gear when the aircraft is on the ground. According to the invention, the body of the steering device is mounted with the ability to rotate about the axis X with a limited amplitude of rotation, and the damping means extend between the body of the steering device and the strut assembly to damp the vibration between the body of the steering device and the strut assembly.

The vibration generated at the wheel is transmitted to the structure of the landing gear then to the structure of the aircraft via the strut, the torque link, the rotating tube, the body of the steering device and the strut assembly. By allowing the body of the steering device a limited amount of rotation about the axis of the strut, and by mounting the damping means on the body of the steering device, it becomes possible to damp vibration between the body of the steering device and the strut assembly. This damping is therefore performed outside of the body of the steering device independently of the drive train of the electromechanical actuator of the steering device. Thus, mechanical disconnection of an output shaft of the electric motor from the electromechanical actuator and the steering tube does not cause the damping means to become deactivated.

BRIEF DESCRIPTION OF THE DRAWINGS

The invention will be better understood in the light of the description which follows, with reference to the figures of the attached drawings among which.

DETAILED DESCRIPTION OF THE INVENTION

Figure 1:
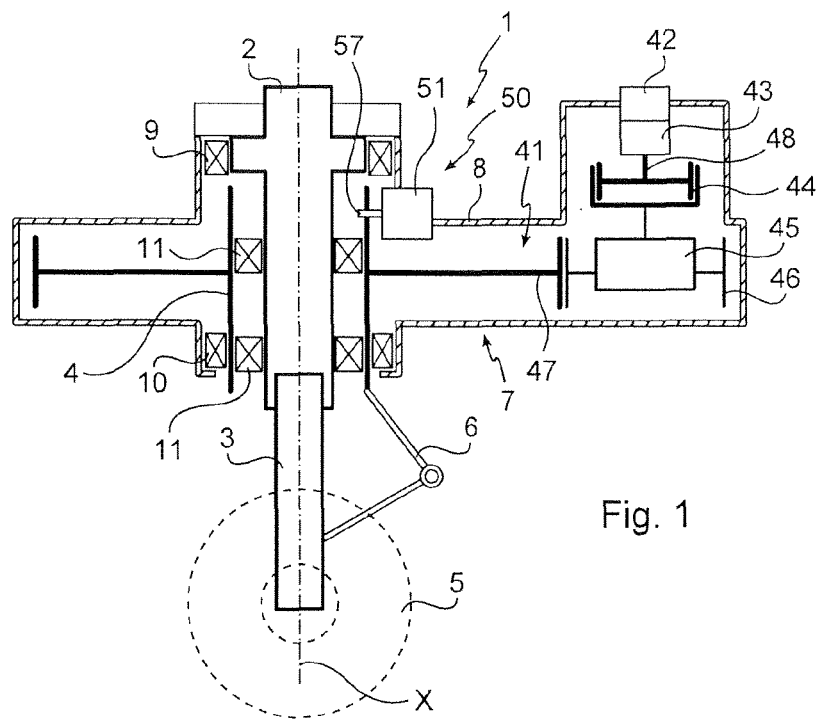
FIG. 1 is a schematic view in cross section and from the side of a landing gear of the invention equipped with a steering device for orientating a wheel of the landing gear.

With reference to FIG. 1, the aircraft landing gear of the invention here is an auxiliary landing gear 1 comprising a strut assembly 2, a strut 3 sliding along an axis of sliding X in the strut assembly 2, and a steering tube 4 mounted with the ability to rotate about the axis X.

The strut assembly 2, of which only the lower part is visible, is articulated at the top to the structure of the aircraft. The steering tube 4 is immobilized axially by means which have not been depicted. A lower end of the strut 3 carries the wheels 5 of the landing gear 1. The rotational connection between the steering tube 4 and the strut 3, which allows them their relative axial movement along the axis X, is provided by a torque link 6 articulated between a lower end of the steering tube 4 and a lower part of the strut 3.

The landing gear 1 is additionally equipped with a steering device 7 for orientating the wheels 5 about the axis X.

The steering device 7 comprises a body 8 mounted with the ability to rotate about the axis X by virtue of a first bearing 9 and a second bearing 10. The first bearing 9 is positioned inside the body 8 of the steering device 7 between the body 8 of the steering device 7 and the strut assembly 2 of the landing gear 1. The second bearing 10 is positioned inside the body 8 of the steering device 7 between the body 8 of the steering device 7 and a lower part of the steering tube 4. Two third bearings 11 are also positioned between the steering tube 4 and the strut assembly 2.

The amplitude of the rotation of the body 8 of the steering device 7 is limited between a maximum angle of rotation and a minimum angle of rotation by end stops which have not been depicted in FIG. 1.

Figure 2:
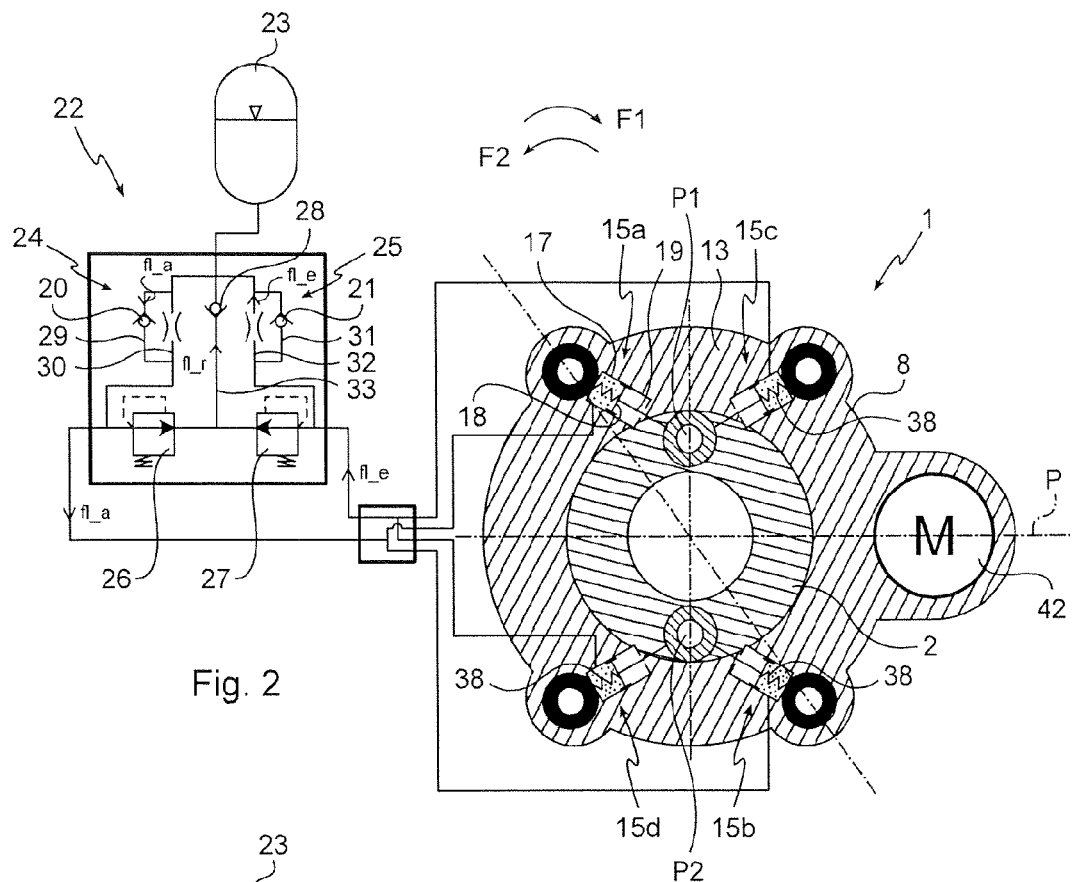
FIG. 2 is a view in cross section and from above of the body of the steering device of the landing gear of the invention, and of the damping means according to a first embodiment which are mounted on the body of the steering device.

With reference to FIG. 2, the body 8 of the steering device 7 has an upper part 13 on which damping means are mounted. These damping means are intended to limit the transmission of vibration from the wheels 5 to the rest of the landing gear 1 and to the structure of the aircraft when the aircraft is on the ground.

The damping means here comprise four hydraulic jacks 15a, 15b, 15c, 15d which are connected to the body 8 of the steering device 7. The hydraulic jacks 15 are in this instance mounted on the upper part 13 of the body 8 of the steering device 7. The hydraulic jacks 15 are split up into a first pair of hydraulic jacks comprising the hydraulic jacks 15a and 15b and a second pair of hydraulic jacks comprising the hydraulic jacks 15c and 15d. The first pair of hydraulic jacks and the second pair of hydraulic jacks are arranged relative to one another symmetrically about a vertical plane P passing through the axis X.

Each of these hydraulic jacks 15 comprises a body 17 mounted on the upper part 13 of the body 8 of the steering device 7 and a piston 18 sliding in the body 17 of the jack 15. The piston 18 is equipped with a rod 19 articulated to the strut assembly 2 of the landing gear 1.

The rods 19 of two adjacent hydraulic jacks 15 of two different pairs are articulated to the same pivot point P1, P2 of the strut assembly 2 of the landing gear 1. In this way, the rods 19 of the hydraulic jacks 15a, 15c are articulated at the pivot point P1 and the rods 19 of the hydraulic jacks 15b, 15d are articulated at the pivot point P2.

The hydraulic jacks 15 are set out in such a way that when the vibration transmitted from the wheels 5 tends to cause the body 8 of the steering device 7 to turn in a clockwise direction, indicated by the arrow F1 in FIG. 2, the rods 19 of the hydraulic jacks 15a, 15b of the first pair of jacks simultaneously extend by a certain length and the rods 19 of the hydraulic jacks 15c, 15d retract simultaneously by the same certain length. Likewise, when the vibration transmitted from the wheels 5 tends cause the body 8 of the steering device 7 to turn in an anticlockwise direction, indicated by the arrow F2 in FIG. 2, the rods 19 of the hydraulic jacks 15c, 15d simultaneously extend by a certain length and the rods 19 of the hydraulic jacks 15a, 15b simultaneously retract by the same certain length.

The use of four hydraulic jacks 15 positioned as described hereinabove makes it possible to avoid applying unwanted tangential or radial loads to the strut assembly 2 of the landing gear 1 and therefore makes it possible not to have to overengineer the first bearing 9 and the second bearing 10. In addition, increasing the number of hydraulic jacks 15 makes it possible to reduce the size and mass of each individual hydraulic jack 15.

The four hydraulic jacks 15 are supplied by a hydraulic supply circuit 22. This hydraulic supply circuit 22 comprises an accumulator 23, a first flow limiter 24 with an inbuilt first nonreturn valve 20, a second flow limiter 25 with an inbuilt second nonreturn valve 21, a first relief valve 26, a second relief valve 27, and a third nonreturn valve 28. These elements are spread across a first supply flow path 29, a first return flow path 30, a second supply flow path 31, a second return flow path 32 and a safety flow path 33.

The two hydraulic jacks 15a, 15b of the first pair of hydraulic jacks are connected to the first supply flow path 29 and to the first return flow path 30, whereas the two hydraulic jacks 15c, 15d of the second pair of jacks are connected to the second supply flow path 31 and to the second return flow path 32.

When the body 8 of the steering device 7 rotates in the clockwise direction, the rods 19 of the hydraulic jacks 15a, 15b of the first pair of jacks extend. An admitted hydraulic fluid fl_a is admitted to the body 17 of the hydraulic jacks 15a, 15b of the first pair of jacks. The admitted hydraulic fluid fl_a passes from the accumulator 23 along the first supply flow path 29 via the first nonreturn valve 20 which allows the admitted fluid fl_a to pass in this direction.

At the same time, the rods 19 of the hydraulic jacks 15c, 15d of the second pair of jacks retract, causing discharge of a discharged hydraulic fluid fl_e from the body 17 of the hydraulic jacks 15c, 15d of the second pair of jacks to the accumulator 23. The discharged hydraulic fluid fl_e passes from the hydraulic jacks 15c, 15d of the second pair of jacks towards the accumulator 23 along the second return flow path 32. The flow rate of the discharged hydraulic fluid fl_e is limited by the second flow limiter 25. The second nonreturn valve 21 built into the second flow limiter 25 prevents the discharged hydraulic fluid fl_e from returning directly to the accumulator 23 without its flow rate being reduced. The second relief valve 27 makes it possible, if the pressure of the discharged hydraulic fluid fl_e is too high because of a sudden and intense mechanical loading on the hydraulic jacks 15c, 15d of the second pair of hydraulic jacks, to limit the pressure within the hydraulic circuit 22 in order to prevent damage to the hydraulic jacks 15c, 15d of the second pair of hydraulic jacks. A residual fluid fl_r therefore returns to the accumulator 23 via the safety flow path 33. The third nonreturn valve 28 allows the return of the residual fluid fl_r but prevents fluid from passing from the accumulator 23 via this emergency flow path 33.

The accumulator 23 acts as a reserve of fluid but also stiffens the damping means.

It will be noted that the desired damping is provided by the second flow limiter 25.

When the body 8 of the steering device 7 turns in the anticlockwise direction, operation of the hydraulic circuit 22 is similar but the reverse.

Note that a return spring 38 is incorporated into the body 17 of each hydraulic jack 15. This return spring 38 allows the piston 18 to be returned to a position of rest. The position of rest here is a position in which the head of the piston 18 is situated in the middle of the body 17 of the jack 15. Thus, when the piston 18 is in the position of rest, the rod 19 of the piston 18 is able to extend or to retract according to the direction of rotation of the body 8 of the steering device 7.

Figure 3:
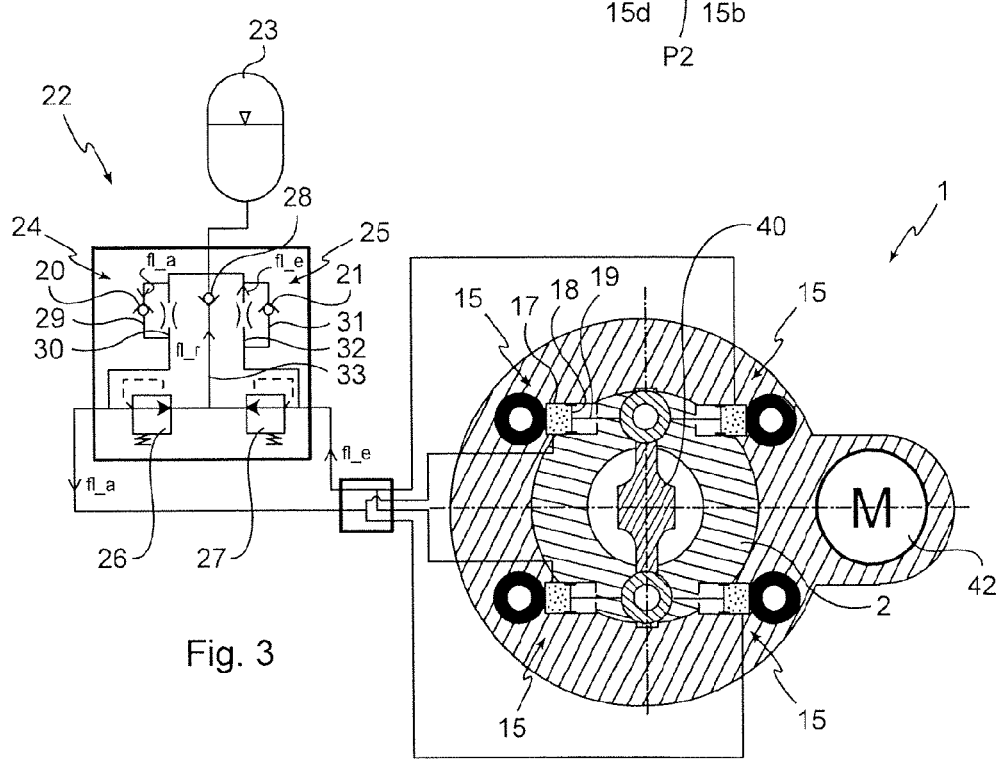
FIG. 3 is a view similar to that of FIG. 2, depicting damping means according to a second embodiment.

In a second embodiment of the damping means, with reference to FIG. 3, the strut assembly 2 the landing gear 1 of the invention is equipped with a bending bar 40. The rod 19 of the piston 18 of each hydraulic jack 15 is this time articulated to the bending bar 40. The use of this bending bar 40 allows the return springs 38 to be removed from the bodies 17 of the hydraulic jacks 15.

An electromechanical actuator 41 which is incorporated into the body 8 of the steering device 7, and the role of which is to act on the steering tube 4 to orient the wheels 5 of the landing gear 1 is now described with reference once again to FIG. 1. The electromechanical actuator 41 comprises an electric motor 42 (also visible in FIGS. 2 and 3), a gearing device 43, a harmonic transmission device 44, clutch means 45, a pinion 46 and a gearwheel 47 that rotates as one with the steering tube 4.

The gearing device 43 is positioned between an output shaft 48 of the electric motor 42 and the harmonic transmission device 44. The gearing device 43 comprises reduction gear stages which collaborate with the output shaft 48 of the electric motor 42. The gearing device 43 makes it possible to step down the output torque required for the electric motor 42 and therefore reduce the size of the electric motor 42 and the mass of the electromechanical actuator 41.

The harmonic transmission device 44 is mechanically connected to the output of the gearing device 43. It is intended to transmit a potentially high torque to the pinion 46 with a high transmission ratio.

The pinion 46 collaborates with the gearwheel 47 so that rotation of the pinion 46 causes rotation of the gearwheel 47 and therefore of the steering tube 4. The electric motor 42 thus drives the rotation of the steering tube 4 and therefore the strut 3 to steer the wheels 5 via the torque link 6.

The clutch means 45 are positioned between the harmonic transmission device 44 and the pinion 46. The clutch means 45 are used for selectively connecting the output shaft 48 of the electric motor 2 and the steering tube 4 (engagement phase) or disconnecting the output shaft 48 of the electric motor 42 and the steering tube 4 (disengagement phase).

Figure 4:
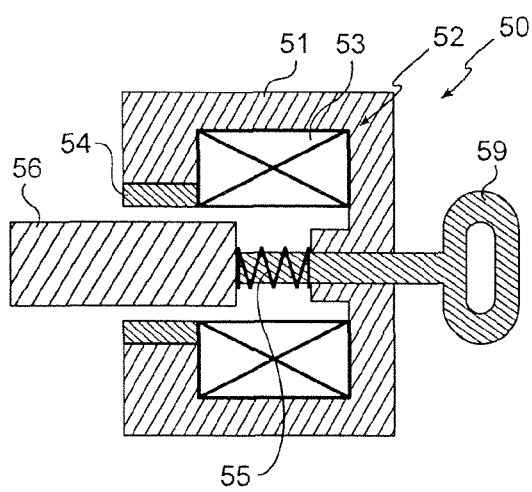
FIG. 4 depicts means of locking the wheel of the landing gear in an angular position according to a first embodiment.
Figure 5:
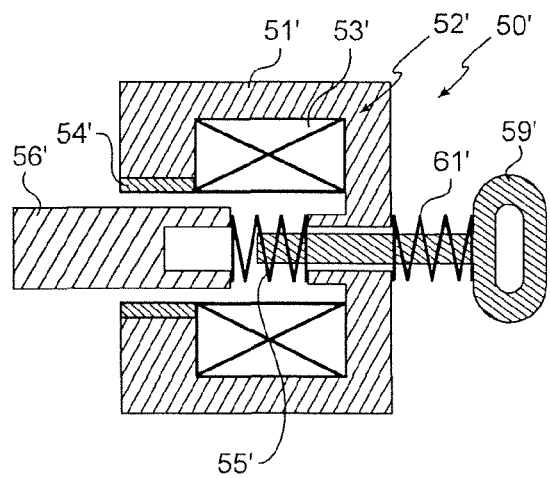
FIG. 5 depicts means of locking the wheel of the landing gear in an angular position according to a second embodiment.

The steering device 8 finally comprises locking means 50 for locking the wheels 5 of the landing gear 1 in an angular position, the said locking means being visible on the one hand in FIG. 1 and on the other hand in FIGS. 4 and 5.

The locking means 50 are intended to prevent selectively any rotation of the steering tube 4 with a view to keeping the wheels 5 of the landing gear 1 in an angular position when the landing gear 1 is retracted inside a bay of the aircraft, or on landing.

With reference to FIG. 4, the locking means 50 according to a first embodiment comprise a body 51 into which a bistable lock 52 is incorporated, and a handle 59 collaborating with the bistable lock 52. The bistable lock 52 comprises an electromagnet 53, a magnet 54, a return spring 55 and a magnetic core plunger 56 extending a locking rod 57 (visible in FIG. 1). The handle 59 translates as one with the magnetic core plunger 56.

The magnetic core plunger 56 is able to move between a locking position (depicted in FIG. 4) and an unlocking position.

In the locking position, the magnetic core plunger 56 extends outside the body 51 of the locking means 50 and positions the locking rod 57 inside an opening of the turning tube 4. The locking rod 57 prevents the turning tube 4 from turning.

In the unlocking position, the magnetic core plunger 56 extends inside the body 51 of the locking means 50 and keeps the locking rod 57 away from the turning tube 4. The turning tube 4 is free to turn and to orient the strut 3 and therefore steer the wheels 5 of the landing gear 1.

Movement of the magnetic core plunger 56 is brought about by supplying the electromagnet with a supply current which, depending on its direction, allows the magnetic core plunger 56 to move towards the locking position or the unlocking position.

When the magnetic core plunger 56 is in the locking position, it is kept in this position by the effect of the return spring 55 on the magnetic core plunger 56. There is therefore no need to maintain the supply to the electromagnet 53.

Likewise, when the magnetic core plunger 56 is in the unlocking position, it is kept in this position by of the magnet 54 on the magnetic core plunger 56. Once again there is therefore no need to maintain the supply to the electromagnet 53.

The locking means 50 can thus be unlocked on the ground without supplying power to the electromagnet 53, simply by pulling on the handle 59 which brings the magnetic core plunger 56 into the unlocked position in which it is held by the return spring 55.

With reference to FIG. 5, the locking means 50 according to a second embodiment once again comprise a body 51' into which a bistable lock 52' is incorporated, and a handle 59' collaborating with the bistable lock 52'. The bistable lock 52' comprises an electromagnet 53', a magnet 54', a first return spring 55' analogous to the return spring 55, a second return spring 61', and a magnetic core plunger 56' extending a locking rod 57'. The handle 59' this time no longer moves as one in terms of translation with the magnetic core plunger 56' but acts as a magnetic short circuit therefor.

When the magnetic core plunger 56' is in the locking position, it is held in this position by the effect of the magnet 54' on the magnetic core plunger 56'. By pushing the handle 59' towards the magnetic core plunger 56' a magnetic short circuit is created when these two elements are in contact. The magnet 54' then no longer acts on the magnetic core plunger 56', which is returned to the unlocking position by the first return spring 55'. The handle 59' is returned to its initial position by the second return spring 61'.

The locking means 50' can therefore also be unlocked on the ground without supplying power to the electromagnet 52', simply by pushing on the handle 52'.

The locking means 50, 50' make it possible to dispense with the centring cam system traditionally used to keep the wheels in position when the landing gear is retracted into the bay.

It will be noted that, in the landing gear of the invention, because the damping means are independent of the drive train for the electromechanical actuator, it is perfectly possible to disconnect the output shaft of the electric motor and the steering tube while still enjoying the damping effect.

To allow disengagement, checks are run in the conventional way to ensure that the aircraft is on the ground being towed or that the speed of the aircraft is relatively high and that the locking means are locking the steering tube so that the steering angle of the wheels is equal to 0°.

A normal landing mode and an alternative landing mode are thus defined.

In the normal landing mode, the steering device is active (the lock of the locking means is not engaged) right from the landing whatever the speed of the aeroplane.

In the alternative landing mode, the steering device is inactive. On landing and at high speed, the lock is engaged and ensures that the steering angle of the wheels is equal to 0°. The hydraulic jacks play their part as dampers. At intermediate speeds, the lock is not engaged but the clutch means are in the clutch engagement phase and maintain the inertia and stiffness afforded by the electromechanical actuator. At low speeds, the clutch means are brought into the disengaged phase to make the aircraft easier to manoeuvre when the aircraft is being towed. The aircraft can no longer steer itself.

The invention is not restricted to the particular embodiments that have just been described but on the contrary covers any variant thereof that falls within the scope of the invention as defined by the claims.

Although it has been indicated that the bodies of the jacks are mounted on the upper part of the body of the steering device, the damping means may be positioned differently provided that they extend between the body of the steering device and the strut assembly.

Although the description refers to a first bearing positioned between the body of the steering device and the strut assembly of the damper, a second bearing positioned between the body of the steering device and a lower part of the steering tube, and two third bearings positioned between the steering tube and the strut assembly, it is possible to plan a different arrangement of the bearings. It is possible to conceive of positioning two bearings between the body of the steering device and the steering tube and two bearings between the tube and the strut assembly. It is also possible to conceive of positioning two bearings between the body and the strut assembly and two bearings between the tube and the strut assembly.

The invention claimed is:

1. An aircraft landing gear comprising:
    a strut assembly (2) articulated to a structure of the aircraft,
    a strut (3) sliding along an axis of sliding X in the strut assembly (2) and a free end of which carries at least one wheel (5),
    a steering tube (4) mounted with the ability to rotate about the axis (X), and
    a torque link (6) connecting the steering tube (4) and the strut (3) in terms of rotation,
    the landing gear (1) additionally being equipped with a steering device (7) for orienting the at least one wheel (5) about the axis X, the steering device (7) comprising a body (8) in which is incorporated an electromechanical actuator (41) equipped with an electric motor (42) intended to drive the rotation of the steering tube (4) and therefore of the strut (3) in order to steer the at least one wheel (5),
    the landing gear being further equipped with damping means intended to limit the transmission of vibration from the at least one wheel (5) to the rest of the landing gear when the aircraft is on the ground,
    characterized in that the body (8) of the steering device (7) is mounted with the ability to rotate about the axis (X) with a limited amplitude of rotation, and
    in that the damping means extend between the body (8) of the steering device (7) and the strut assembly (2) to damp the vibration between the body (8) of the steering device (7) and the strut assembly (2).

2. The aircraft landing gear according to claim 1, in which the damping means comprise at least one hydraulic jack (15).

3. The aircraft landing gear according to claim 2, in which the at least one hydraulic jack (15) comprises a body (17) connected to the body (8) of the steering device (7) and a piston (18) sliding in the body (17) of the at least one hydraulic jack (15) provided with a rod (19) articulated to the strut assembly (2) of the landing gear (1).

4. The aircraft landing gear according to claim 3, in which a return spring (38) is incorporated into the body (17) of the at least one hydraulic jack (15).

5. The aircraft landing gear according to claim 3, in which the strut assembly (2) is equipped with a bending bar (40), and in which the rod (19) of the piston (18) is articulated to the bending bar (40).

6. The aircraft landing gear according to claim 2, in which the damping means comprise two pairs of hydraulic jacks (15) positioned relative to one another symmetrically about a vertical plane (P) passing through the axis X.

7. The aircraft landing gear according to claim 1, in which the electromechanical actuator (41) of the steering device (7) is equipped with clutch means (45) designed selectively to couple an output shaft (48) of the electric motor (42) to the steering tube (4) or uncouple same therefrom.

8. The aircraft landing gear according to claim 1, in which the steering device (7) comprises locking means (50, 50') for locking the at least one wheel (5) of the landing gear (1) in an angular position.

9. The aircraft landing gear according to claim 8, in which the locking means (50, 50') comprise a lock (52, 52') designed to prevent the steering tube (4) from turning.

10. The aircraft landing gear according to claim 9, in which the lock (52, 52') is a bistable lock.

11. The aircraft landing gear according to claim 9, in which the lock comprises an electromagnet (53, 53').

12. The aircraft landing gear according to claim 9, in which the locking means (50, 50') comprise a handle (59, 59') allowing the angular position of the at least one wheel (5) of the landing gear (1) to be unlocked manually.

* * * * *